(12) United States Patent
Edpalm

(10) Patent No.: US 10,334,267 B2
(45) Date of Patent: Jun. 25, 2019

(54) VIDEO ENCODER AND A METHOD IN A VIDEO ENCODER

(71) Applicant: Axis AB, Lund (SE)

(72) Inventor: Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/894,438

(22) Filed: Feb. 12, 2018

(65) Prior Publication Data

US 2018/0255315 A1 Sep. 6, 2018

(30) Foreign Application Priority Data

Mar. 2, 2017 (GB) .................................... 17158882

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 19/51 | (2014.01) |
| H04N 19/593 | (2014.01) |
| H04N 19/176 | (2014.01) |

(Continued)

(52) U.S. Cl.
CPC ........... *H04N 19/51* (2014.11); *H04N 19/107* (2014.11); *H04N 19/109* (2014.11); *H04N 19/14* (2014.11); *H04N 19/176* (2014.11); *H04N 19/182* (2014.11); *H04N 19/593* (2014.11); *H04N 19/567* (2014.11)

(58) Field of Classification Search
CPC .................................................... H04N 19/107
See application file for complete search history.

(56) References Cited

U.S. PATENT DOCUMENTS

| | | |
|---|---|---|
| 8,121,193 B2 | 2/2012 | Nakagomi et al. |
| 8,588,301 B2 | 11/2013 | Kobayashi |

(Continued)

FOREIGN PATENT DOCUMENTS

JP  2006 094081 A  4/2006

OTHER PUBLICATIONS

Optimizing Intra/Inter Coding Mode Decisions; Chen et al.; In Proc. of International Symposium on Multimedia Information Processing; Dec. 1997; pp. 561-568.

(Continued)

*Primary Examiner* — Tat C Chio
*Assistant Examiner* — Fabio S Lima
(74) *Attorney, Agent, or Firm* — Volpe and Koenig, P.C.

(57) ABSTRACT

A video encoder receives a frame to be encoded and divides the current frame into blocks of pixels. For each block, a spatial variability is calculated and a cost function used to evaluate a cost for inter-coding the block of pixels is set to be dependent on the spatial variability. A ratio of a weight associated with a cost of encoding a motion vector and a weight associated with a sum of differences value is set to be lower if the spatial variability of the block of pixels in the current frame is below a first threshold compared to if the spatial variability is equal to or above the first threshold. The block is matched with a plurality of blocks in a reference frame, and a cost for inter-coding the block with reference to each of the plurality of blocks in a reference frame is evaluated according to the cost function.

11 Claims, 3 Drawing Sheets

(51) Int. Cl.
*H04N 19/182* (2014.01)
*H04N 19/107* (2014.01)
*H04N 19/109* (2014.01)
*H04N 19/14* (2014.01)
*H04N 19/567* (2014.01)

(56) References Cited

U.S. PATENT DOCUMENTS

| | | | |
|---|---|---|---|
| 2005/0025249 A1 | 2/2005 | Zhao et al. | |
| 2005/0069211 A1* | 3/2005 | Lee | H04N 19/172 382/239 |
| 2007/0274396 A1 | 11/2007 | Zhang et al. | |
| 2008/0002770 A1 | 1/2008 | Ugur et al. | |
| 2008/0112481 A1 | 5/2008 | Hsaing et al. | |
| 2009/0147845 A1 | 6/2009 | Matsumura et al. | |
| 2010/0284464 A1 | 11/2010 | Nagori et al. | |
| 2011/0002385 A1 | 1/2011 | Kobayashi | |
| 2011/0051811 A1* | 3/2011 | Wang | H04N 19/50 375/240.12 |
| 2011/0122942 A1 | 5/2011 | Kudana et al. | |
| 2013/0202036 A1 | 8/2013 | Nagori et al. | |
| 2016/0373739 A1* | 12/2016 | Holcomb | H04N 19/147 |
| 2018/0007362 A1* | 1/2018 | Krishnan | H04N 19/132 |

OTHER PUBLICATIONS

EP 17158882.5 European Search Report (dated May 24, 2017).

\* cited by examiner

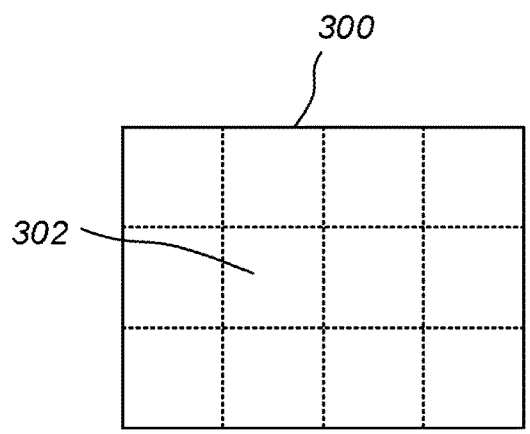
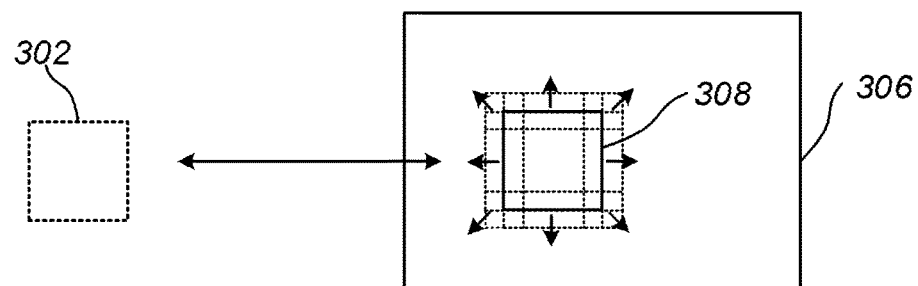
Fig. 3a
Fig. 3b
Fig. 3c
Fig. 3d
Fig. 3e

VIDEO ENCODER AND A METHOD IN A VIDEO ENCODER

FIELD OF INVENTION

The present invention relates to the field of video encoding. In particular, it relates to a video encoder and a method in a video encoder.

BACKGROUND

When encoding a sequence of video frames, it is common practice to divide each video frame into blocks of pixels, such as blocks of 16×16 pixels, 32×32 pixels, or 64×64 pixels depending on the coding standard used, and encode the frame block-by-block. These blocks are known as macroblocks in H.264/MPEG-4 AVC, and coding units in H.265/HEVC. The blocks may be encoded as intra-blocks, sometimes referred to as I-blocks, or as inter-blocks, sometimes referred to as P- or B-blocks. If a block is intra-coded, the pixel values are encoded with reference to the current frame only, such as by extrapolating from the edges of neighbouring blocks in the same frame. This is in contrast to inter-coded blocks, which are encoded with reference to a block of pixels in a reference frame by carrying out motion compensation. The motion compensation includes finding a matching block of pixels in the reference frame. In order to find the matching block, a motion vector and a sum of difference (SAD) value may be evaluated with respect to a plurality of blocks of pixels in the reference frame. The block of pixels in the reference frame that gives the best match according to a cost function, which is a function of the motion vector and the SAD value, is then selected.

In some frames, referred to as intra-frames, all blocks of pixels are intra-coded. In other frames, referred to as inter-frames, some blocks of pixels are intra-coded and others are inter-coded. In inter-frames, a decision is taken whether to encode each block of pixels as an intra-coded block or an inter-coded block. The decision is usually taken based on which of intra-coding and inter-coding will give the lowest encoding cost. The cost for intra-coding a block is typically given in terms of a predefined value corresponding to an average cost of intra-coding a block as determined from historical data. The cost for inter-coding a block is typically determined as a weighted sum of the cost of encoding the motion vector and the SAD value of the selected block in the reference frame, for some predefined weights.

The above approach of using predefined values for calculating the costs for intra-coding, and predefined weights for calculating the costs for inter-coding may however lead to suboptimal performance in some cases. For example, consider a block of pixels having low contrast, such as a block depicting a clear sky or a white wall. The above approach will be biased towards selecting to encode the block as an inter-coded block, since it typically will be possible to find plenty of matching blocks in the reference frame having low SAD values. Further, for the same reason, there will be a bias towards selecting a zero motion vector. This may be disadvantageous in many situations. For example, this may lead to that the motion of a small moving object, such as a distant airplane in a clear sky, or a line on a wall which moves in the video as the camera sweeps by, is not correctly encoded. Rather, the motion of the object will have a jumping behaviour in the decoded video. This may be detrimental in a surveillance situation where also a small detail in an otherwise uniform background may be important. There is thus room for improvements.

SUMMARY

In view of the above, it is thus important to overcome at least some of the problems mentioned above and provide an improved encoding of moving objects, in particular small moving objects, in a uniform background.

According to a first aspect a method in a video encoder comprises:

receiving a current frame to be encoded and dividing the current frame into blocks of pixels, calculating a spatial variability of a block of pixels of the current frame, matching the block of pixels of the current frame with a plurality of blocks of pixels of a reference frame, wherein, for each of the plurality of blocks of pixels in the reference frame, a motion vector and a sum of absolute differences (SAD) between the block of pixels of the current frame and the block of pixels in the reference frame are calculated, and a cost for encoding the block of pixels of the current frame as an inter-coded block with reference to the block of pixels in the reference frame is evaluated according to a cost function which is a weighted sum of a cost of encoding the motion vector and the SAD calculated with respect to the block of pixels in the reference frame, wherein the cost function is set to be dependent on the spatial variability of the block of pixels in the current frame, such that a ratio of a weight associated with the cost of encoding the motion vector and a weight associated with the SAD is lower if the spatial variability of the block of pixels in the current frame is below a first threshold compared to if the spatial variability is equal to or above the first threshold, and encoding the block of pixels of the current frame, wherein, in case the block of pixels of the current frame is encoded as an inter-coded block, the block of pixels of the current frame is encoded with reference to a block of pixels in the reference frame having a lowest evaluated cost.

With this arrangement, the cost function used to evaluate the inter-block encoding cost is allowed to depend on the spatial variability of the block of pixels in the current frame. In more detail, for blocks with lower spatial variability, i.e., lower complexity blocks, the cost for encoding the motion vector is downweighted in relation to the SAD, in comparison to blocks with higher spatial variability, where the cost for encoding the motion vector rather is upweighted in relation to the SAD. Typically, the cost for encoding a motion vector is proportional to the logarithm of the length of the motion vector. Thus, for blocks with lower spatial variability, the block matching will be more prone to select longer, non-zero, motion vectors. In the end, this will lead to that the motion of small moving objects, such as a distant airplane in a clear sky, or a line on a wall which moves in the video as the camera sweeps by, is more correctly encoded without the jumping behaviour described above.

Conversely, for blocks having higher spatial variability, the block matching will be more prone to select a shorter, typically zero, motion vector. This is advantageous for the reason that the SAD will not be very low even when the "correct" reference block has been found. This, in addition to the fact that it is more likely that the block has only moved a short bit between two frames means that it is more appropriate to prioritize a short motion vector in this case.

By a block of pixels of the current frame is generally meant a macroblock as known from H.264/MPEG-4 AVC or a coding unit in H.265/HEVC.

By a block of pixels in a reference frame is meant any block of pixels having the same size as the block of pixels (i.e., the macroblock) of the current frame. Typically, the plurality of blocks of pixels in the reference frame include a block of pixels having a corresponding position to the macroblock of the current frame, and blocks of pixels whose positions are shifted by one or more pixels in relation to the position of the macroblock of the current frame.

By spatial variability is generally meant any measure of the variability, complexity, and/or contrast in the block of pixels. This includes, but is not limited to, the variance and standard deviation of the pixel values in the block of pixels.

By cost is generally meant the bit cost, i.e., the number of bits, for representing an encoded version of a block of pixels.

The ratio of the weight associated with the cost of encoding the motion vector and the weight associated with the SAD may be decreased in relation to a first predetermined value if the spatial variability of the block of pixels in the current frame is below the first threshold. Thus, there may be a default value, the first predetermined value, of the ratio, and a first threshold value of the spatial variability. If the spatial variability of the block of pixels falls below the first threshold, the spatial variability in the block of pixels is deemed to be low. As a result, the ratio is decreased from the default value, i.e., the penalty of having a long motion vector is reduced in relation to the penalty of having a high SAD value.

Similarly, the ratio of the weight associated with the cost of encoding the motion vector and the weight associated with the SAD may be increased in relation to a first predetermined value if the spatial variability of the block of pixels in the current frame is above a second threshold which is equal to or greater than the first threshold. Thus, if the spatial variability of the block of pixels is above the second threshold, the contrast in the block of pixels is deemed to be high. As a result, the ratio is increased from its default value, i.e., the penalty of having a long motion vector is increased in relation to the penalty of having a high SAD value.

According to the above, the ratio of the weight associated with the cost of encoding the motion vector, and a weight associated with the SAD is set to be dependent on the spatial variability of the block of pixels of the current frame. The ratio of the weight associated with the cost of encoding the motion vector and the weight associated with the SAD may further be set to be dependent on a compression level associated with the block of pixels in the current frame. The cost of encoding the motion vector is typically independent of the compression level. However, the residual cost for inter-coding the block, as represented by the SAD, is directly related to the compression level. Therefore, since the cost for encoding the block of pixels of the current frame as an inter-coded block depends on the compression level, this may be taken into account when setting the ratio of the weights. For example, if the compression level is high it is not as relevant to change the cost function associated with inter-coding of the block.

In the step of encoding the block of pixels of the current frame, the block of pixels of the current frame is encoded as an intra-coded block or an inter-coded block depending on the value of the lowest evaluated cost. The method may thus further decide whether the block should be inter-coded or intra-coded.

The decision is typically based on which of the intra-coding and the inter-coding that will give the lowest encoding cost. In more detail, the method may further comprise: determining that the cost for encoding the block of pixels of the current frame as an inter-coded block is equal to the lowest evaluated cost, comparing the cost for encoding the block of pixels in the current frame as an inter-coded block to a cost for encoding the block of pixels in the current frame as an intra-coded block, and encoding the block of pixels in the current frame as an inter-coded block if the cost for encoding the block of pixels in the current frame as an inter-coded block is lower than the cost for encoding the block of pixels in the current frame as an intra-coded block, and encoding the block of pixels in the current frame as an intra-coded block if the cost for encoding the block of pixels in the current frame as an inter-coded block is greater than or equal to the cost for encoding the block of pixels in the current frame as an intra-coded block.

As further mentioned above, the cost for intra-coding a block may be given in terms of a predefined value corresponding to an average cost of infra-coding a block (regardless of its spatial variability) as determined from historical data. When a block of pixels has a high variability, complexity and/or contrast, such as a block depicting a face, text, grass or a tree, the above approach will therefore be biased towards intra-coding of the block. More specifically, the block of pixels will generate a high SAD value causing the inter-coding cost to be high, and likely to exceed the predefined, average, intra-coding cost that does not take spatial variability into account. This may in the end give rise to unnecessarily high and bandwidth demanding encoding costs.

However, also the cost of intra-coding a block may be set to be dependent on the spatial variability of the block. More specifically, prior to the step of comparing, the cost for encoding the block of pixels in the current frame as an intra-coded block may be adjusted based on the spatial variability of the block of pixels in the current frame, such that the cost for encoding the block of pixels in the current frame as an intra-coded block is higher if the spatial variability is equal to or above the first threshold compared to if the spatial variability is below the first threshold.

With this arrangement, the method will become more prone to select intra-coding instead of inter-coding when the spatial variability is low and less prone when the spatial variability is high. This makes sense since the true cost of encoding a low contrast block as an intra-coded block is usually much lower than for an average block, and sometimes the true cost for intra-coding a low contrast block may even be comparable to, or lower, than the true cost for inter-coding of the block. Similarly, the true cost for intra-coding a high contrast block is usually much higher than for an average block, and therefore it makes sense to adjust the cost for intra-coding of a block such that it is higher for high contrast blocks. In this way, the number of high contrast blocks that are intra-coded will decrease, thereby saving bandwidth.

In particular, the cost for encoding the block of pixels in the current frame as an intra-coded block may be adjusted such that it corresponds to an average cost for encoding a block of pixels having the calculated spatial variability as an intra-coded block. The average cost for encoding a block of pixels having the calculated spatial variability as an intra-coded block may be determined from historical data. Thus, instead of using an intra-coding cost value that corresponds to an average cost of intra-coding a block regardless of its spatial variability, one may use an intra-coding cost value that corresponds to an average cost of intra-coding a block having a specific spatial variability.

Similar to the cost of inter-coding, the cost for encoding a block of pixels as an intra-coded block may not only be adjusted based on spatial variability of the block, but also based on the compression level. More specifically, the adjustment of the cost for encoding the block of pixels in the current frame as an intra-coded block may further be based on a compression level associated with the block of pixels in the current frame.

There may be a second threshold value, which is equal to or larger than the first threshold value, to be used when determining if a spatial variability is high or not. If the spatial variability of the block of pixels in the current frame is above the second threshold, the cost for encoding the block of pixels in the current frame as an intra-coded block may be increased from a second predetermined value. The second predetermined value may, e.g., correspond to an average cost of infra-coding a block (regardless of its spatial variability) as determined from historical data. In this way, the method is made less prone to intra-code the block if it has a high spatial variability.

It is possible to increase the intra-coding cost from the second predetermined value, to another, higher, predetermined value if the spatial variability is above the second threshold. However, it is also possible that the amount by which the intra-coding cost is increased is a function of spatial variability. In particular, it is preferable if the amount increases with spatial variability, since the advantageous effect of saving bandwidth increases with spatial variability. For this purpose, the cost for encoding the block of pixels in the current frame as an intra-coded block may be increased from the second predetermined value by an amount which is an increasing function of spatial variability. The increasing function of spatial variability is typically predetermined, and has typically been determined from historical data. For example, the increasing function of spatial variability may, for each value of the spatial variability, correspond to the offset between the average cost for encoding a block of pixels having the spatial variability as an intra-coded block and the second predetermined value.

Similarly, the cost for encoding the block of pixels in the current frame as an intra-coded block may be decreased from the second predetermined value if the spatial variability is below the first threshold. In that way, the method becomes more prone to intra-code low contrast blocks, thereby further making sure that a moving object in a uniform background is correctly encoded. In that case, the amount of decrease may be a decreasing function of spatial variability.

According to a second aspect, there is provided a video encoder. The video encoder comprises:

a receiver configured to receive a current frame to be encoded, a block dividing component configured to divide the current frame into blocks of pixels, a block matching component configured to match a block of pixels in the current frame with a plurality of blocks of pixels of a reference frame, wherein, for each of the plurality of blocks of pixels in the reference frame, the block matching component is configured to calculate a motion vector and a sum of absolute differences, SAD, between the block of pixels in the current frame and the block of pixels in the reference frame, and to evaluate a cost for encoding the block of pixels in the current frame as an inter-coded block with reference to the block of pixels in the reference frame according to a cost function which is a weighted sum of a cost of encoding the motion vector and the SAD calculated with respect to the block of pixels in the reference frame, a spatial variability calculating component configured to calculate a spatial variability of the block of pixels in the current frame, a cost function setting component configured to calculate a spatial variability of a block of pixels in the current frame, and to set the cost function to be dependent on the spatial variability of the block of pixels in the current frame, such that a ratio of a weight associated with the cost of encoding the motion vector and a weight associated with the SAD is lower if the spatial variability of the block of pixels in the current frame is below a first threshold compared to if the spatial variability is equal to or above the first threshold, and a block encoding component configured to encode the block of pixels of the current frame, wherein, in case the block of pixels of the current frame is encoded as an inter-coded block, the block of pixels of the current frame is encoded with reference to a block of pixels in the reference frame having a lowest evaluated cost.

According to a third aspect, there is provided a non-transitory computer-readable medium having computer code instructions stored thereon which, when executed by a device having processing capability, are adapted to carry out the method according to the first aspect.

The second and third aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages will be better understood through the following illustrative and non-limiting detailed description of preferred embodiments with reference to the appended drawings, where the same reference numerals will be used for similar elements, wherein:

FIG. 3a schematically illustrates a frame which is divided into blocks of pixels.

FIG. 3b illustrates a matching between a block of pixels of the frame of FIG. 3a with a plurality of blocks of pixels of a reference frame.

FIG. 3c illustrates calculated costs for encoding motion vectors, and SAD values of the plurality of blocks of pixels of the reference frame of FIG. 3b.

FIG. 3d illustrates evaluation of a cost function for the plurality of blocks of pixels of the reference frame of FIG. 3b according to embodiments.

FIG. 3e illustrates evaluation of a cost function for the plurality of blocks of pixels of the reference frame of FIG. 3b according to prior art methods.

DETAILED DESCRIPTION

The present teachings will now be described more fully hereinafter with reference to the accompanying drawings, in which embodiments of the invention are shown. The teachings may, however, be embodied in many different forms and should not be construed as limited to the embodiments set forth herein; rather, these embodiments are provided for thoroughness and completeness, and to fully convey the scope of the invention to the skilled person. The systems and devices disclosed herein will be described during operation.

Figure 1:
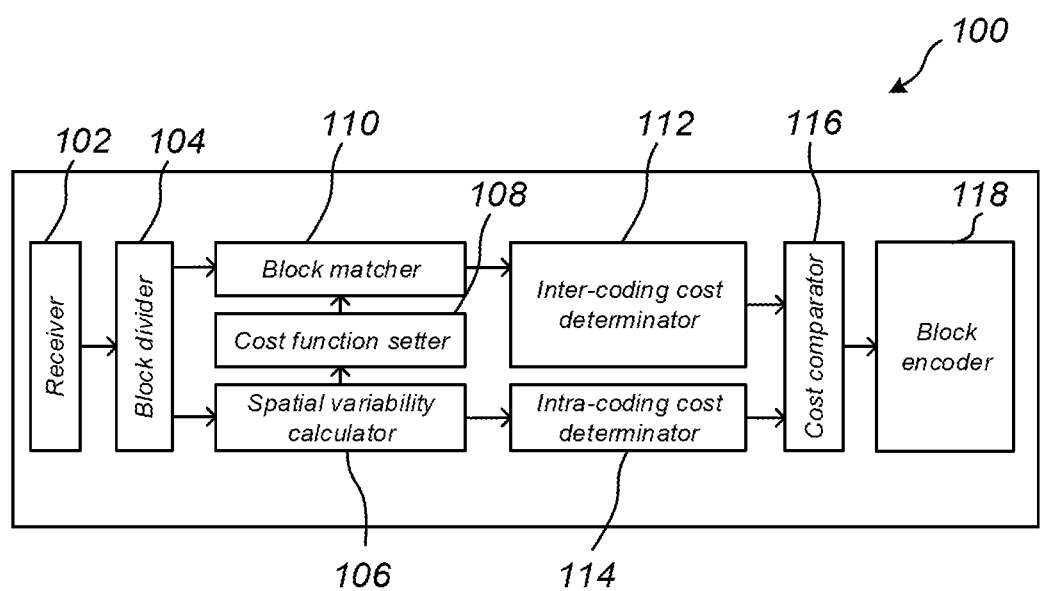
FIG. 1 is a schematic illustration of a video encoder according to embodiments.

FIG. 1 illustrates a video encoder 100. The video encoder 100 may be comprised in a video camera. The video encoder comprises a receiver 102, a block dividing component 104, a spatial variability calculating component 106, a cost function setting component 108, a block matching component 110, and a block encoding component 118. In some embodiments, the video encoder 100 may also comprise an inter-coding cost determining component 112 and a cost comparing component 116. Also, the video encoder 100 may in some embodiments comprise an intra-coding cost determining component 114.

The video encoder 100 thus comprises various components 102, 104, 106, 108, 110, 112, 114, 116, 118 which are configured to implement the functionality of the video encoder 100. In particular, each illustrated component corresponds to a functionality of the video encoder 100. Generally, the video encoder 100 may comprise circuitry which is configured to implement the components 102, 104, 106, 108, 110, 112, 114, 116, 118 and, more specifically, their functionality.

In a hardware implementation, each of the components 102, 104, 106, 108, 110, 112, 114, 116, 118 may correspond to circuitry which is dedicated and specifically designed to provide the functionality of the component. The circuitry may be in the form of one or more integrated circuits, such as one or more application specific integrated circuits. By way of example, the block divider 104 may thus comprise circuitry which, when in use, divides a frame into blocks of pixels.

In a software implementation, the circuitry may instead be in the form of a processor, such as a microprocessor, which in association with computer code instructions stored on a (non-transitory) computer-readable medium, such as a non-volatile memory, causes the video encoder 100 to carry out any method disclosed herein. In that case, the components 102, 104, 106, 108, 110, 112, 114, 116, 118 may thus each correspond to a portion of computer code instructions stored on the computer-readable medium, that, when executed by the processor, causes the video encoder 100 to carry out the functionality of the component.

It is to be understood that it is also possible to have a combination of a hardware and a software implementation, meaning that the functionality of some of the components 102, 104, 106, 108, 110, 112, 114, 116, 118 are implemented in hardware and others in software.

The operation of the video encoder will be described in the following with reference to FIG. 1, FIGS. 3a-e, and the flow chart of FIG. 2. In the flow chart of FIG. 2, the blocks with dashed lines represent optional steps which will be described at the end of the description of FIG. 2.

In step S02, the receiver 102 receives a frame, such as a current frame, to be encoded. The frame to be encoded is shown as frame 300 in FIG. 3a. It is to be understood that the frame is an image frame of a video stream, i.e., an image frame in a sequence of image frames which are received by receiver 102.

In step S04, the block dividing component 104 divides the frame 300 into blocks of pixels 302 as further illustrated in FIG. 3a. The blocks of pixels 302 may, e.g., be a block of 16×16 pixels or 8×8 pixels. The blocks of pixels correspond to the macroblocks of the H.264 standard or the coding units of the H.265 standard. In H.264/MPEG-4 AVC, the macroblocks are typically of size 16×16 pixels, while in H.265/HEVC the coding units have a more variable size, but which typically are based on blocks of size 32×32 or 62×62. The frame 300 is assumed to be an inter-frame, implying that the blocks of pixels 302 will either be inter-coded or intra-coded. This is in contrast to an intra-frame where all blocks of pixels are intra-coded.

Figure 2:
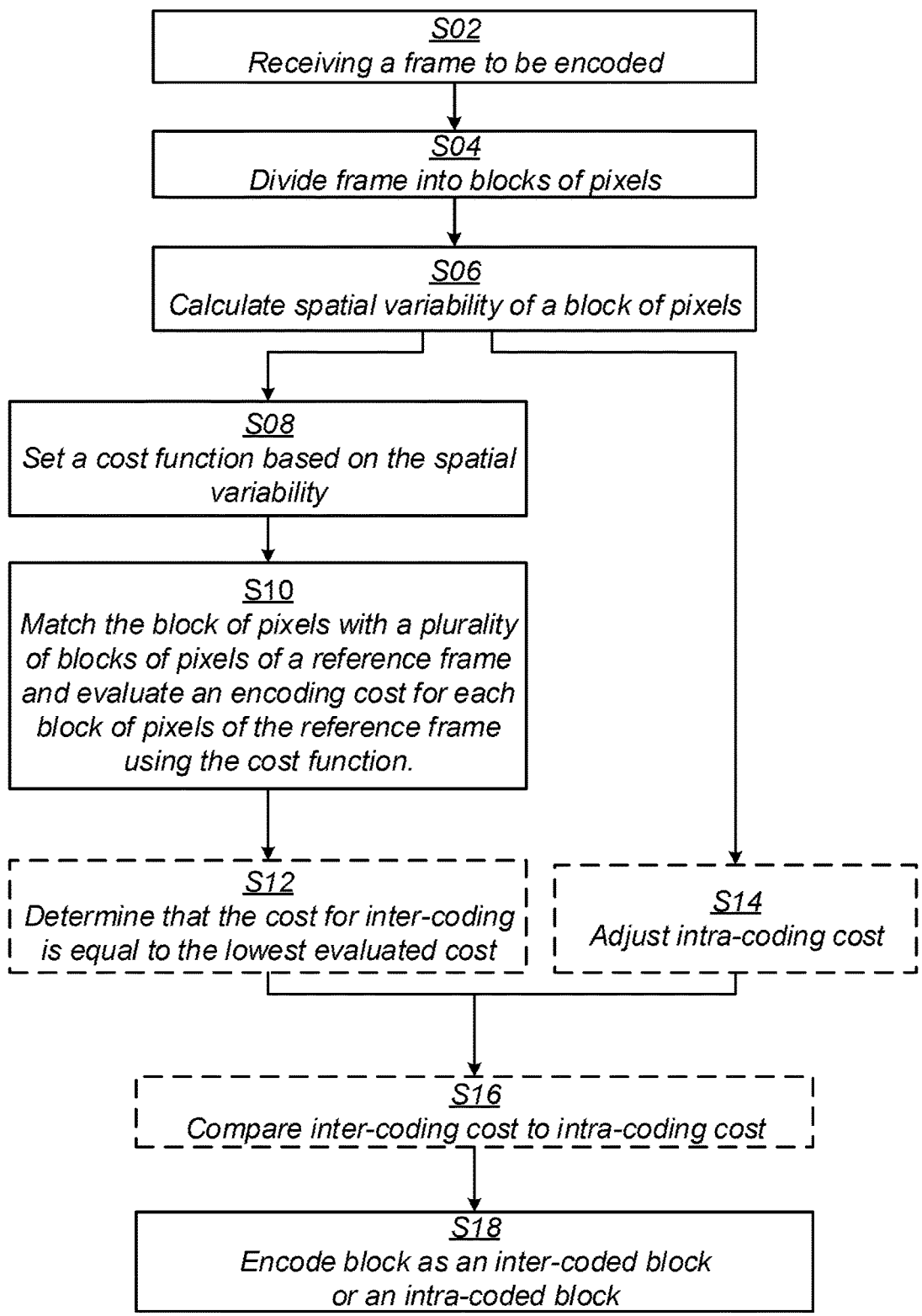
FIG. 2 is a flowchart of a method in a video encoder according to embodiments.

The following steps of the method of FIG. 2 are typically carried out for each block of pixels 302 of the frame 300. The following description describes the steps taken with respect to one block of pixels 302 of the frame 300.

In step S06, the spatial variability calculating component 106 calculates a spatial variability of the block of pixels 302 of the frame 300. The spatial variability is generally a measure of variability of the pixel values in the block of pixels. In this sense the spatial variability is a measure of complexity. The spatial variability may for instance be calculated as the variance or the standard deviation of the pixel values in the block of pixels 302.

In step S08, the cost function setting component 108 sets a value of a cost function which is used to evaluate a cost for inter-coding the block of pixels 302 of the frame 300 with reference to each of a plurality of blocks 308 of the same size in a reference frame 306.

The plurality of blocks of pixels 308 of the reference frame 308 may typically comprise a block which has the corresponding position in the reference frame 306 as the block of pixels 302 has in the frame 300 (this is the solid block inside the reference frame 306 of FIG. 3b), and blocks which are translations in the vertical, horizontal and diagonal directions of the block having that corresponding position (these are the dashed blocks inside the reference frame 306. The arrows illustrate the translation of the centre block). In the illustrated case, the plurality of blocks comprises nine blocks in the reference frame 306. However, that is of course variable. Generally, the plurality of blocks 308 in the reference frame may correspond to blocks within a predefined motion search area, such as all blocks having a centre point falling within a certain predefined range from the centre of the centre of the block of pixels 302.

The reference frame is a frame that is stored in the encoder, and which typically corresponds to a previously decoded frame of the video stream. As is known in the art, a video encoder typically comprises a decoder which mimics the decoder that will decode the encoded video stream. Following encoding, the video encoder thus decodes the encoded frames, and saves the decoded frames as reference frames to be used by the encoder when encoding subsequent frames.

Generally, the cost function $P_{cost}$ is of the form:

$$P_{cost} = w_1 \cdot cost(mv) + w_2 \cdot SAD + \alpha.$$

Here cost(mv) refers to a cost for encoding a motion vector mv. Typically, the cost for encoding a motion vector is related to the length of the motion vector, such as being proportional to the $^2$log of the length of the motion vector. SAD is short for sum of absolute differences, $w_1$ and $w_2$ are weights, and $\alpha$ is a constant. In other words, the cost function may be described as a weighted sum of a cost of encoding a motion vector and a sum of differences value.

The cost function setting component 108 sets the cost function to be dependent on the spatial variability. In more detail, the cost function setting component 108 sets the weights $w_1$ and $w_2$, or at least the ratio $w_1/w_2$, of the cost function. The weights $w_1$ and $w_2$ are selected such that the ratio $w_1/w_2$ is lower if the spatial variability of the block of pixels 302 is below a first, predefined, threshold, compared to if the spatial variability is equal to or above the first threshold. For example, there may be a first predetermined value, i.e., a default value of the ratio $w_1/w_2$. If the cost function setting component 108 finds that spatial variability is below the first threshold, it may decrease the ratio $w_1/w_2$. In a practical implementation, there may be some default values of $w_1$ and $w_2$. If the variability is below the first threshold, $w_1$ could be decreased and/or $w_2$ could be increased, thereby decreasing the ratio. In this way, the penalty of the SAD value is increased in relation to the penalty of the encoding cost of the motion vector. In the end, this will make the encoder 100 more prone to encode the block 302 with reference to a block in the reference frame which is associated with a longer motion vector.

In the example illustrated in FIGS. 3a-d, the default cost function is assumed to be:

$$P_{cost} = 10 \cdot cost(mv) + 1 \cdot SAD + 5.$$

The default values of $w_1$ and $w_2$ may be set empirically by encoding a lot of videos and optimizing the video quality and bitrate based on the possible choices of the encoding parameters. There is further some underlying reasoning for the cost. For example, the constant value α, here equal to 5, is an estimated overhead of encoding the block instead of skipping it.

The spatial variability is in the FIGS. 3a-d example found to be low, i.e., below the first threshold, and thus the ratio of $w_1/w_2$ should be decreased. In this case, the ratio is decreased by decreasing the value of $w_1$ from 10 to 4, while keeping the value of $w_2$ at 1. Appropriate values to decrease to may be found empirically by analysing historical data as described above.

If, on the other hand, the spatial variability is above a second threshold, which is greater or equal to the first threshold, the cost function setting component 108 may either choose to keep the default ratio of $w_1/w_2$, or to increase the ratio $w_1/w_2$ from the first predetermined value. As explained above, there may in practice be default values of $w_1$ and $w_2$. The ratio may thus be increased by increasing $w_1$ and/or decreasing $w_2$. If the spatial variability is between the first threshold and the second threshold, it may keep the default ratio of $w_1/w_2$, e.g., by keeping the default values of $w_1$ and $w_2$. In this way, the cost function setting component 108 may thus set the ratio $w_1/w_2$ to be an increasing function of spatial variability.

The cost function setting component 108 may not only set the cost function based on spatial variability, but also based on a compression level, such as a current quantization value, to be used when encoding the block of pixels 302. In particular, the amount of increase or decrease of the ratio $w_1/w_2$, or the weights $w_1$ and $w_2$ may be a function of the compression level. For example, the amount of increase of decrease may be smaller for a higher level of compression. The rationale behind this is that at high compression levels, e.g., at high values of the quantization parameter in H.264, the general encoding assumptions are much worse, e.g., we will always have large SAD values due to the compression, even when the block itself has not moved or changed. Since it is known that the model that is used is worse for high compression levels, a conservative approach is to rely on it less for high compression levels, thus making smaller changes for high compression levels.

In step S10, a matching procedure is carried out in which the block of pixels 302 of the frame 300 is matched with the plurality of blocks of pixels 308 of the same size of the reference frame 304.

In order to perform the matching, the block matching component 110 calculates a motion vector and a sum of absolute differences, SAD, with respect to each of the plurality of blocks 308 in the reference frame 306. The motion vector is a vector which points from a centre of the block 302 (or rather its corresponding position in the reference frame 306) to the centre of the concerned block 308 in the reference frame 306. The motion vector has a length which, e.g., may be calculated using the Euclidean norm, or the Manhattan norm. The SAD may be calculated according to:

$$AD = \sum_{i=1}^{N} |x_i - y_i|$$

where N is the number of pixels in the block 302, $x_i$ is the pixel value for pixel i in the block 302, and $y_i$ is the pixel value for pixel i in the concerned block 308. In the example of FIGS. 3a-d, calculated SAD values and motion vector length (labelled MV in FIG. 3c) are given for the nine blocks 308 in the reference frame 308, see FIG. 3c.

Once the block matching component 110 has calculated the motion vector and SAD for the blocks 308 in the reference frame 306 it proceeds to evaluate a cost for inter-coding the block 302 with reference to each of the blocks 308 in the reference frame. In order to evaluate the cost, the cost function that was determined in step S08 is used. In this respect, the cost for encoding the motion vector may be set to be proportional to $^2$log of the length of the motion vector, for some predefined constant of proportionality.

This is further illustrated in FIG. 3d, where a cost for encoding the block 302 as an inter-coded block with reference to each of the blocks 308 in the reference frame 306 is shown. For reasons of illustration, the cost for encoding the motion vector is in the example set to be equal to the length of the motion vector. Notably, the block corresponding to the bottom middle position 310 has the lowest evaluated cost.

In a last step, S18, the block encoder 118 proceeds to encode the block 302 of the frame 300. In case the block 302 is encoded as an inter-coded block, the block 302 will be encoded with reference to the block of pixels in the reference frame having the lowest evaluated cost. In the example of FIGS. 3a-3d, the block 302 would thus be encoded with reference to the block 308 of the reference frame 306 corresponding to the bottom middle position 310 of FIG. 3d.

For the sake of comparison. FIG. 3e illustrates the cost for encoding the block 302 as an inter-coded block with reference to each of the blocks 308 in the reference frame 306 if the default cost function is used. Under that circumstances, the block corresponding to the centre position in FIG. 3e would be selected if the block 302 is inter-coded. This example thus illustrates that by setting the cost function based on the spatial variability of the block, the bias towards selecting a block with zero motion vector is reduced.

As mentioned above, the blocks 302 of the frame 300 may either be encoded as an inter-coded block, i.e., with reference to a block of a reference frame, or as an intra-coded block, i.e., by only referring to the current frame. The video encoder 100 may further decide, on a block-by-block basis whether to encode a block as an intra-coded block or an inter-coded block. Thus, some blocks in the frame 300 may be intra-coded while others are inter-coded. The decision is generally based on an expected cost for inter-coding the block in relation to an expected cost for infra-coding the block.

In step S12, the inter-coding cost determining component 112 may therefore determine a cost for encoding the block 302 of pixels of the frame 300 as an inter-coded block. The determination is based on the costs that were evaluated in step S10. In more detail, the inter-coding cost determining component 112 determines that the cost for encoding the block 302 of pixels of the frame 300 as an inter-coded block is equal to the lowest cost that was evaluated with respect to the block 302 in step S10.

In step S16, the cost comparing component 116 then compares the cost for encoding the block 302 as an inter-coded block to a cost for encoding the block 302 as an intra-coded block. On basis of the comparison, the cost comparing component 116 then determines that the block 302 will be intra-coded or inter-coded depending on which of intra-coding and inter-coding is associated with the lowest cost. The block 302 is then, in step S18, intra-coded if intra-coding was found to give the lowest cost in step S16, or inter-coded if inter-coding was found to give the lowest cost in step S16.

The cost of encoding the block 302 as an intra-coded block may correspond to a default predetermined value, referred to herein as the second predetermined value, which is the same regardless of the spatial variability in the block 302. However, also the cost for encoding the block 302 as an intra-coded block may be set to be dependent on the spatial variability of the block 302 as calculated in step S06. In more detail, the intra-coding cost determining component 114, may set, or adjust, the intra-coding cost such that the cost for intra-coding the block 302 is higher if the spatial variability is equal to or above the first threshold compared to if the spatial variability is below the first threshold. For example, the intra-coding cost may be increased from the second predetermined value if the spatial variability is above the second threshold, i.e., if the spatial variability is deemed to be high. In particular, the intra-coding cost may be increased from the second predetermined value by an amount which is an increasing function of spatial variability. Thus, the higher the spatial variability, the higher the intra-coding cost.

Typically, historical data may be analysed to find appropriate levels of the intra-coding cost for different spatial variabilities. For example, an average intra-coding cost for encoding blocks having a certain spatial variability may be calculated based on historical data. Such average intra-coding costs may be calculated for a number of different spatial variabilities. Having access to such calculated average intra-coding costs for different spatial variabilities, the cost for intra-coding the block 302 may be set to the average cost for intra-coding a block having the spatial variability calculated in step S06. The average cost for intra-coding a block will typically be an increasing function of spatial variability and is therefore hence an example of a function that can be used to determine the amount by which the intra-coding cost should be increased from the second predetermined value.

The adjustment of the intra-coding cost may further be based on a compression level associated with the block 302. The intra-coding cost is directly related to the compression level in that a higher compression level gives a lower intra-coding cost, and, vice versa, that a lower compression level gives a higher intra-coding cost. It is therefore an advantage to take the compression level into account when adjusting the intra-coding cost.

Similarly, the intra-coding cost may be decreased from the second predetermined value if the spatial variability is below the first threshold. In that case, the amount of decrease may be set according to a decreasing function of spatial variability. Also in this case, the intra-coding cost may be determined such that it corresponds to an average cost for intra-coding a block of pixels having the spatial variability that was calculated in step S06.

Above, with reference to steps S08 and S14, it was described that the cost for encoding a block as an inter-block and an intra-block respectively was adjusted. Further, it was described the adjustment may be based on a compression level. However, it is also possible that the adjustment is based on a configuration of the encoder, i.e., on a configuration which defines how the encoder will process the frames.

According to one example, the encoder may be configured to process different blocks of the same frame using different compression levels. For example, a global compression level, such as a global quantization parameter, may be set for the frame, and deviations from the global compression level may be set for the blocks of the frame. This information may be taken into account in step S08 and/or step S14 such that the cost function in step S08 is set so as to take the block-specific compression level into account and/or the intra-coding cost in step S14 is adjusted to take the block-specific compression level into account.

According to another example, the encoder may be configured to apply, post-encoding, a process referred to as zapping. Zapping is a method which is used to remove some, in real life, very unlikely combinations of frequencies once a block has been encoded. The configuration of the encoder with respect to zapping is dependent on noise level, motion level, and compression level, such as the quantization parameter, of the block. The level of aggressiveness of the zapping, i.e., the level of removal of frequencies, may be taken into account when setting the cost function in step S08 and/or when adjusting the intra-coding cost in step S14.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

What is claimed is:
1. A method in a video encoder, comprising:
receiving a current frame to be encoded and dividing the current frame into blocks of pixels,
calculating a spatial variability of a block of pixels of the current frame,
matching the block of pixels of the current frame with a plurality of blocks of pixels of a reference frame,
wherein, for each of the plurality of blocks of pixels in the reference frame, a motion vector and a sum of absolute differences (SAD) between the block of pixels of the current frame and the block of pixels in the reference frame are calculated, and a cost for encoding the block of pixels of the current frame as an inter-coded block with reference to the block of pixels in the reference frame is evaluated according to a cost function which is a weighted sum of a cost of encoding the motion vector and the SAD calculated with respect to the block of pixels in the reference frame, wherein the cost function is set to be dependent on the spatial variability of the block of pixels in the current frame, such that a ratio of a weight associated with the cost of encoding the motion vector and a weight associated with the SAD is lower if the spatial variability of the block of pixels in the current frame is below a first threshold compared to if the spatial variability is equal to or above the first threshold, determining that the cost for encoding the block of pixels of the current frame as an inter-coded block is equal to the lowest evaluated cost, adjusting a predefined value as a cost for encoding the block of pixels in the current frame as an intra-coded block based on the spatial variability of the block of pixels in the current frame, such that the cost for encoding the block of pixels in the current frame as an intra-coded block is higher if the spatial variability is equal to or above the first threshold compared to if the spatial variability is below the first threshold, comparing the cost for encoding the block of pixels in the current frame as an inter-coded block to the cost for encoding the block of pixels in the current frame as an intra-coded block, encoding the block of pixels of the current frame as an inter-coded block if the cost for encoding the block of pixels in the current frame as an inter-coded block is lower than the cost for encoding the block of pixels in the current frame as an intra-coded block, wherein the block of pixels of the current frame is encoded with reference to a block of pixels in the reference frame having a lowest evaluated cost, and encoding the block of pixels in the current frame as an intra-coded block if the cost for encoding the block of pixels in the current frame as an inter-coded block is greater than or equal to the cost for encoding the block of pixels in the current frame as an intra-coded block.

2. The method of claim 1, wherein the ratio of the weight associated with the cost of encoding the motion vector and the weight associated with the SAD is decreased in relation to a first predetermined value if the spatial variability of the block of pixels in the current frame is below the first threshold.

3. The method of claim 1, wherein the ratio of the weight associated with the cost of encoding the motion vector and the weight associated with the SAD is increased in relation to a first predetermined value if the spatial variability of the block of pixels in the current frame is above a second threshold which is equal to or greater than the first threshold.

4. The method of claim 1, wherein the ratio of the weight associated with the cost of encoding the motion vector and a weight associated with the SAD further is further set to be dependent on a compression level associated with the block of pixels in the current frame.

5. The method of claim 1, wherein the cost for encoding the block of pixels in the current frame as an intra-coded block is adjusted such that it corresponds to an average cost for encoding a block of pixels having the calculated spatial variability as an intra-coded block.

6. The method of claim 1, wherein the adjustment of the cost for encoding the block of pixels in the current frame as an intra-coded block is further based on a compression level associated with the block of pixels in the current frame.

7. The method of claim 1, wherein if the spatial variability of the block of pixels in the current frame is above a second threshold, which is equal to or higher than the first threshold, the cost for encoding the block of pixels in the current frame as an intra-coded block is increased from a second predetermined value.

8. The method of claim 7, wherein the cost for encoding the block of pixels in the current frame as an intra-coded block is increased from the second predetermined value by an amount which is an increasing function of spatial variability.

9. The method of claim 1, wherein the cost for encoding the block of pixels in the current frame as an intra-coded block is decreased from a second predetermined value if the spatial variability is below the first threshold.

10. A video encoder, comprising:
a receiver configured to receive a current frame to be encoded,
a block dividing component configured to divide the current frame (300) into blocks of pixels,
a block matching component configured to match a block of pixels in the current frame with a plurality of blocks of pixels of a reference frame,
wherein, for each of the plurality of blocks of pixels in the reference frame, the block matching component is configured to calculate a motion vector and a sum of absolute differences (SAD) between the block of pixels in the current frame and the block of pixels in the reference frame, and to evaluate a cost for encoding the block of pixels in the current frame as an inter-coded block with reference to the block of pixels in the reference frame according to a cost function which is a weighted sum of a cost of encoding the motion vector and the SAD calculated with respect to the block of pixels in the reference frame,
a spatial variability calculating component configured to calculate a spatial variability of the block of pixels in the current frame,
a cost function setting component configured to set the cost function to be dependent on the spatial variability of the block of pixels in the current frame, such that a ratio of a weight associated with the cost of encoding the motion vector and a weight associated with the SAD is lower if the spatial variability of the block of pixels in the current frame is below a first threshold compared to if the spatial variability is equal to or above the first threshold,
an inter-coding cost determining component configured to determine that the cost for encoding the block of pixels of the current frame as an inter-coded block is equal to the lowest evaluated cost,
an intra-coding cost determining component configured to adjust a predefined value as a cost for encoding the block of pixels in the current frame as an intra-coded block based on the spatial variability of the block of pixels in the current frame, such that the cost for encoding the block of pixels in the current frame as an intra-coded block is higher if the spatial variability is equal to or above the first threshold compared to if the spatial variability is below the first threshold,
a cost comparing component configured to compare the cost for encoding the block of pixels in the current frame as an inter-coded block to the cost for encoding the block of pixels in the current frame as an intra-coded block, and
a block encoding component configured to:
encode the block of pixels of the current frame as an inter-coded block if the cost for encoding the block of pixels in the current frame as an inter-coded block is lower than the cost for encoding the block of pixels in the current frame as an intra-coded block, wherein the block of pixels of the current frame is encoded with reference to a block of pixels in the reference frame having a lowest evaluated cost, and encode the block of pixels in the current frame as an intra-coded block if the cost for encoding the block of pixels in the current frame as an inter-coded block is greater than or equal to the cost for encoding the block of pixels in the current frame as an intra-coded block.

11. A non-transitory computer-readable storage medium having computer code instructions stored thereon which, when executed by a device having processing capability, are adapted to carry out the method according to claim 1.

* * * * *